United States Patent
Santana De Oliveira et al.

(10) Patent No.: US 12,505,229 B2
(45) Date of Patent: Dec. 23, 2025

(54) MACHINE LEARNING MODELS WITH MULTI-BUDGET DIFFERENTIAL PRIVACY

(71) Applicant: SAP SE, Walldorf (DE)

(72) Inventors: Anderson Santana De Oliveira, Antibes (FR); Caelin Kaplan, Nice (FR)

(73) Assignee: SAP SE, Walldorf (DE)

( * ) Notice: Subject to any disclaimer, the term of this patent is extended or adjusted under 35 U.S.C. 154(b) by 976 days.

(21) Appl. No.: 17/678,449

(22) Filed: Feb. 23, 2022

(65) Prior Publication Data

US 2023/0267216 A1    Aug. 24, 2023

(51) Int. Cl.
*G06F 21/60* (2013.01)
*G06F 21/62* (2013.01)
(Continued)

(52) U.S. Cl.
CPC .......... *G06F 21/60* (2013.01); *G06V 10/7747* (2022.01); *G06V 10/776* (2022.01); *G06F 21/6245* (2013.01); *G06F 21/6254* (2013.01); *G06N 3/0455* (2023.01); *G06N 3/08* (2013.01); *G06N 7/01* (2023.01); *G06N 20/20* (2019.01); *G06T 2207/20084* (2013.01); *G06V 10/82* (2022.01)

(58) Field of Classification Search
CPC .. G06F 21/60; G06F 21/6245; G06F 21/6254; G06V 10/7747; G06V 10/776; G06V 10/82; G06N 3/88; G06N 20/20; G06N 7/01; G06N 3/08; G06N 3/0455; G06T 2207/20084
See application file for complete search history.

(56) References Cited

U.S. PATENT DOCUMENTS

| | | | |
|---|---|---|---|
| 12,072,954 B1 * | 8/2024 | Li | G06F 18/2148 |
| 2020/0184106 A1 | 6/2020 | Santana De Oliveira et al. | |
| 2020/0285737 A1 * | 9/2020 | Kraus | G06F 21/552 |

FOREIGN PATENT DOCUMENTS

| | | | | |
|---|---|---|---|---|
| EP | 3839790 A1 * | 6/2021 | | G06F 21/6245 |
| WO | WO-2021158313 A1 * | 8/2021 | | G06N 20/00 |

OTHER PUBLICATIONS

Abadi, Martin, et al., "Deep Learning with Differential Privacy", Proceedings of the ACM SIGSAC Conference on Computer and Communications Security, (2016), 308-318.

(Continued)

*Primary Examiner* — Quoc A Tran
(74) *Attorney, Agent, or Firm* — SCHWEGMAN LUNDBERG & WOESSNER, P.A.

(57) ABSTRACT

Various examples are directed to systems and methods for using a machine learning model. A computing system may access training data comprising a plurality of training data items. Each of the plurality of training data items may comprise a plurality of features. From a first training data item of the plurality of training data items, the computing system may generate a first transformed training data item using a first privacy budget corresponding to a first portion of the first training data item and a second privacy budget corresponding to a second portion of the first training data item. The computing system may train a machine learning model using the first transformed training data item and use the trained machine learning model to generate at least one class probability for a data item.

20 Claims, 9 Drawing Sheets

(51) Int. Cl.

| | |
|---|---|
| G06N 3/0455 | (2023.01) |
| G06N 3/08 | (2023.01) |
| G06N 7/01 | (2023.01) |
| G06N 20/20 | (2019.01) |
| G06V 10/774 | (2022.01) |
| G06V 10/776 | (2022.01) |
| G06V 10/82 | (2022.01) |

(56) References Cited

OTHER PUBLICATIONS

Barbaro, Michael, et al., "A Face is Exposed for AOL Searcher No. 4417749.", The New York Times, [Online]. Retrieved from the Internet: <URL:https://www.nytimes.com/2006/08/09/technology/09aol.html>, (Aug. 9, 2006), 4 pgs.

Bernau, Daniel, et al., "Assessing differentially private deep learning with Membership Inference", arXiv preprint arXiv:1912.11328v4, (2020), 17 pgs.

Dwork, Cynthia, "Differential privacy—A Survey of Results", International Conference on Theory and Applications of Models of Computation Springer, Berlin, Heidelberg, (2008), 1-19.

Dwork, Cynthia, et al., "The Algorithmic Foundations of Differential Privacy", Foundations and Trends in Theoretical Computer Science, 9(3-4), 211-407., (2014), 281 pgs.

Figerio, Lorenzo, et al., "Differentially private generative adversarial networks for time series, continuous, and discrete open data", IFIP International Conference on ICT Systems Security and Privacy Protection, (2019), 18 pgs.

Goodfellow, Ian, et al., "Generative Adversarial Nets", Proceedings of NIPS, (2014), 9 pgs.

Gupta, Aman, "Feature Selection Techniques in Machine Learning", Analytics Vidhya, [Online]. Retrieved from the Internet: <URL:https://www.analyticsvidhya.com/blog/2020/10/feature-selection-techniques-in-machine-learning/>, (Oct. 10, 20), 10 pgs.

Hilprecht, Benjamin, et al., "Monte Carlo and Reconstruction Membership Inference Attacks against Generative Models", Proceedings on Privacy Enhancing Technologies, 4, [Online]. Retrieved from the Internet: <URL: https://petsymposium.org/2019/files/papers/issue4/popets-2019-0067.pdf>, (2019), 232-249.

Kingma, Diederik P, et al., "Auto-Encoding Variational Bayes", arXiv:1312.6114v10, (2014), 14 pgs.

Narayanan, Arvind, et al., "Robust De-anonymization of Large Sparse Datasets", IEEE Symposium on Security and Privacy, (2008), 111-125.

Nasr, Milad, et al., "Comprehensive privacy analysis of deep learning: Passive and active white-box inference attacks against centralized and federated learning", IEEE Symposium on Security and Privacy (SP), pp. 739-752, (2019), 15 pgs.

Nasr, Milad, et al., "Machine learning with membership privacy using adversarial regularization", Conference on Computer and Communications Security, (2018), 634-646.

Odena, Augustus, et al., "Conditional image synthesis with auxiliary classifier gans", International conference on machine learning, (2017), 12 pgs.

Papernot, Nicolas, et al., "Semi-supervised Knowledge Transfer for Deep Learning from Private Training Data", 5th International Conference on Learning Representations (ICLR), (Apr. 24, 2017), 1-16.

Shokri, Reza, et al., "Membership Inference Attacks Against Machine Learning Models", IEEE Symposium on Security and Privacy (SP), (2017), 3-18.

Sweeney, Latanya, "Weaving Technology and Policy Together to Maintain Confidentiality", The Journal of Law, Medicine & Ethics, 25, (1997), 98-110.

\* cited by examiner

MACHINE LEARNING MODELS WITH MULTI-BUDGET DIFFERENTIAL PRIVACY

BACKGROUND

Machine learning models take advantage of the availability of vast amounts of data that can be used for training. In some cases, however, available training data contains sensitive information. Although training data is typically not included in the output of a machine learning model, it may still be possible to infer the content of the training data from model's output, making the machine learning model vulnerable to a membership inference attack.

BRIEF DESCRIPTION OF DRAWINGS

The present disclosure is illustrated by way of example and not limitation in the following figures.

DETAILED DESCRIPTION

Figure 1:
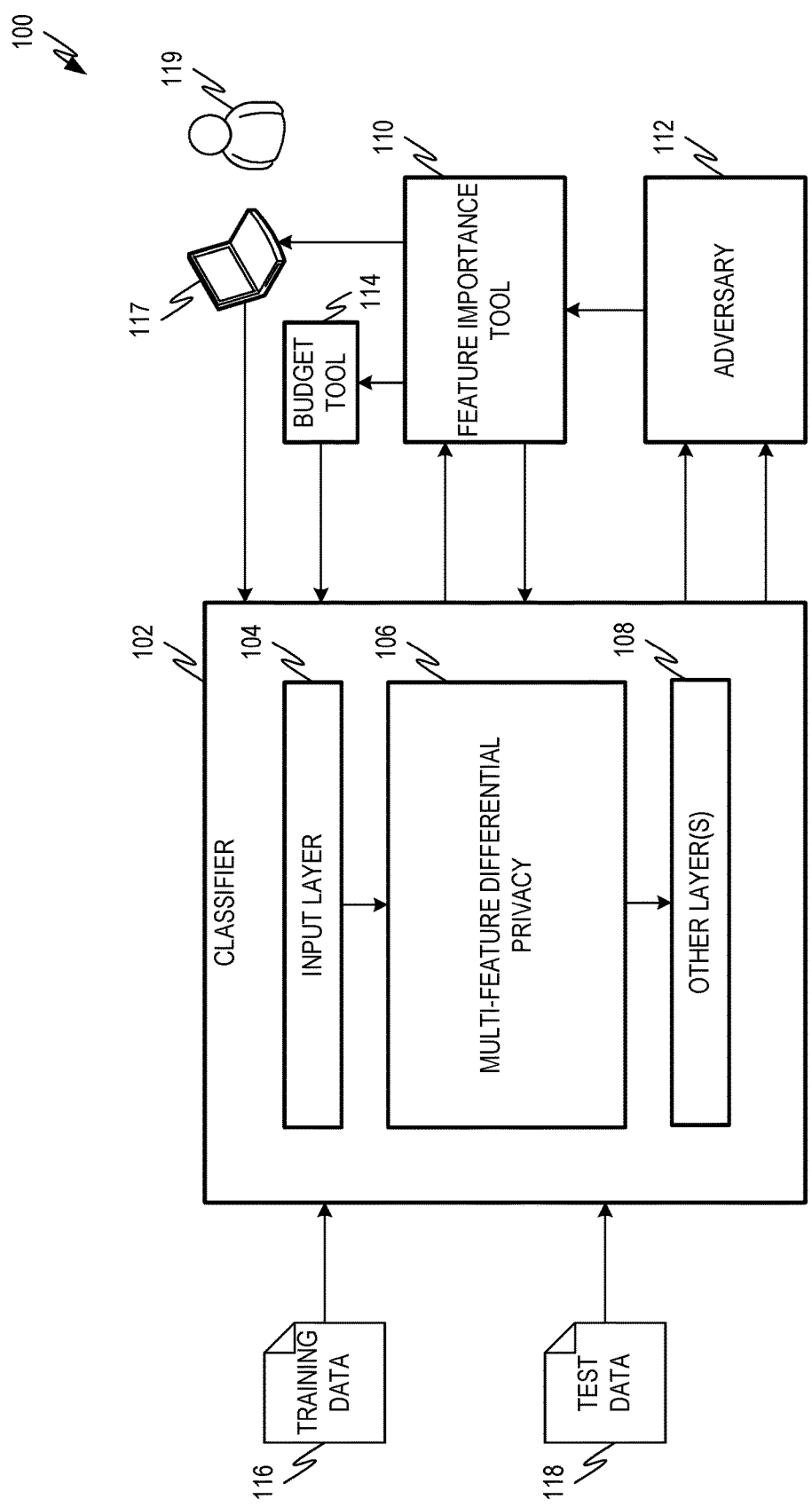
FIG. 1 is a diagram showing one example of an arrangement for implementing differential privacy by feature.

Machine learning models trained with potentially sensitive training data may be vulnerable to membership inference attacks. In a membership inference attack, an attacker evaluates a degree to which a machine learning model behaves differently when an input sample for the machine learning model is part of the set of training data used to train the model versus when the input sample is from a set of non-training data. By observing differences in the behavior of the trained model, the attacker may identify data items that were part of the training data for the machine learning model, including potentially sensitive data items.

Differential privacy techniques can be used to protect sensitive training data from membership inference attacks, for example, by adding random noise during the training of a machine learning model. The random noise can be applied to the training data itself and/or incorporated into the training process. For example, when a machine learning model is trained using a gradient descent technique, differential privacy may include adding random noise to the gradients determined at the end of each training epoch. Adding random noise with a differential privacy technique may cause the machine learning model to behave slightly differently than it otherwise would so as to obscure or make it more difficult to determine whether any given data item was part of the training data set.

Various differential privacy techniques apply random noise according to a constraint or condition. Consider the differential privacy condition given by Equation [1] below:

$$S \subseteq \text{Range}(M), \Pr[M(X_1) \in S] \leq \exp(\varepsilon) \times \Pr[M(X_2) \in S] + \delta \quad [1]$$

In Equation [1], M is a randomized function. M is ($\varepsilon$, $\delta$)-differentially private if it meets the differential privacy condition given by Equation [1]. In Equation [1], $X_1$ and $X_2$ are sets of machine learning model training data differing on, at most, one data item. $M(X_1)$ and $M(X_2)$ are the output of random noise applied to the training data sets. S is a value in the set of all possible outputs of M. The value $\delta$ is the probability of failure (for example, the probability that the difference between $X_1$ and $X_2$ is detectable via a membership inference attack).

The value $\varepsilon$ is the privacy parameter and may also be referred to as a privacy budget. For example, the privacy budget $\varepsilon$ may describe the maximum permissible difference between a query on the training data and the training data adding or removing one entry. The privacy budget can also describe the amount of random noise that is added to the machine learning training data set $X_1$, such that the resulting machine learning model cannot be discerned from a machine learning model trained on the machine learning training data set adding or removing one entry $X_2$. A lower privacy budget (e.g., a smaller permissible difference between the training data set $X_1$ and the training data set adding or removing one entry $X_2$) implies a higher level of random noise added to the training data set $X_1$.

As the privacy budget $\varepsilon$ decreases, the output of the differential privacy mechanism becomes more private. For example, as the privacy budget $\varepsilon$ is reduced, the difference between the output of a machine learning model trained with the set of training data $X_1$ and the output of a machine learning model trained with the training data adding or removing one entry $X_2$ decreases, making it more difficult to discern whether any given data item was part of the training data set. However, decreases in the privacy budget $\varepsilon$ may also increase the difference between the output of the machine learning model trained with the set of training data $X_1$ and the output of the machine learning model trained with differentially private training data $M(X_1)$. Accordingly, the privacy budget $\varepsilon$ may be selected to optimize the relationship between privacy and model accuracy.

In various examples, the privacy budget for a differential privacy technique is applied equally to all of the data items making up a training data set. For example, when differential privacy applies random noise to gradients determined during a gradient-descent training process, the noise may be applied across all elements of the gradient vector. Also, for example, when differential privacy is applied directly to training data, it may be applied equally across different features of the training data items.

In some examples, however, training data may have features with differing levels of sensitivity. Consider an example machine learning model that is trained to classify individuals by their propensity to purchase a product. Various training data items for the example machine learning model may include features describing individuals such as, for example, name, age, address, prior purchases, and so forth. Some of these features, such as the individual's name and prior purchases, may be sensitive while other features, such as the individuals state of residence, may not be as sensitive. Consider another example machine learning model that is trained to perform face recognition. Various training data items may include images including the faces of individuals. Some features of the training data items, such as the images of individual's faces, may be sensitive while other features, such as the background or surroundings of the individuals, may not be as sensitive.

In various differential privacy techniques, however, a privacy budget is applied across all features collectively. Accordingly, accuracy loss to create the acceptable level of privacy for the sensitive features is applied over all of the features of the training data. This may reduce the accuracy of the machine learning model.

Various examples address these and other issues by utilizing differential privacy by feature with multiple privacy budgets, where different privacy budgets may be used and applied to different features of the training data. The machine learning model may be trained with a lower privacy budget for more sensitive features and a higher privacy budget for less sensitive features. This may improve the performance of the machine learning model, as the reduction in model accuracy resulting from the use of a low privacy budget may be applied on a feature-by-feature basis rather than being distributed over all features of the training data set.

Using differential privacy by feature may also have advantages in situations where it is desirable to train a machine learning model while limiting the dependence of the machine learning model on a particular training data feature or features. Consider an example classifier machine learning model that is trained to identify individuals who are candidates for a loan or other similar product. In some examples, differential privacy can be applied to features that should not be considered by the machine learning model so as to reduce or eliminate the impact of the disfavored features in the output of the model.

FIG. 1 is a diagram showing one example of an environment 100 for implementing differential privacy by feature. The environment 100 includes a classifier 102, an adversary model 112, a feature importance tool 110, and a budget tool 114. Various components, including, for example, the classifier 102, the adversary model 112, the feature importance tool 110, and the budget tool 114 may execute at one or more computing devices, such as the computing devices described herein with respect to FIGS. 8 and 9.

The classifier 102 is a machine learning model that is arranged as a neural network having various layers, such as input layer 104, multi-feature differential privacy layer 106, and/or other layers 108. Each layer includes one or more nodes, sometimes referred to as neurons. Each node or neuron receives an input value, performs a calculation on the input value, and generates an output value. The output values are then provided to a node or nodes of the next layer of the neural network. The input to the first layer or input layer 104 is the training data 116, test data 118, or other input data to the classifier 102. The output of a final layer is (or is converted) to the output of the classifier 102.

The output of the classifier 102 for a given input data item may include, for example, a class probability or set of class probabilities describing the input data item. Consider again the example in which the classifier 102 is trained to indicate the propensity of an individual to buy a product. An input data item may include various features describing an individual. The output of the classifier 102 may include a probability that the individual falls into a class of people who are likely to purchase the product. Also consider the example in which the classifier 102 is trained to perform face recognition. An input data item may include an image. The output of the classifier 102 may include a probability that the image depicts a human face.

In the example of FIG. 1, the input layer 104 receives input data items. Input data items received by the classifier 102 may include, for example, training data 116 and/or test data 118, as described herein. Each input data item may have a set of features. Consider again the example in which the classifier 102 is trained to classify individuals by their propensity to purchase a product. An input data item for the classifier 102 may include various features describing a particular individual such as, for example, name, age, address, prior purchases, etc. Also consider the example in which the classifier 102 is trained to perform face recognition or other image processing. An input data item may include an image, with different portions of the image (foreground, background, etc.) constituting different features.

The input layer 104 may provide the input data to a multi-feature differential privacy layer 106. The multi-feature differential privacy layer 106 may apply differential privacy separately to different features of the input data. For example, the multi-feature differential privacy layer 106 may use a set of privacy budgets, with each privacy budget corresponding to one feature of the input data or a set of less than all of the features of the input data. The multi-feature differential privacy layer 106 may apply noise to the features of the input data based in the privacy budget associated with each feature.

The other layer or layers 108 of the classifier 102 may be additional layers of the neural network implementation used to build the classifier 102. For example, the other layer or layers 108 may receive the output of the multi-feature differential privacy layer 106 as input and may generate one or more additional layers of output, with an output of, for example, a last of the one or more other layers 108 being an output of the classifier 102 indicating a classification of the input data.

The classifier 102 may be trained using the training data 116. Any suitable training technique may be used such as, for example, gradient descent, back-propagation, or the like. During the training process, a training epoch includes providing the data items included in the training data 116 as input data to the classifier 102. The multi-feature differential privacy layer 106 applies differential privacy to the training data items from the training data 116 on a feature-by-feature basis, as described herein, to generate transformed training data items. The transformed training data items may be differentially private, for example, according to privacy budgets for the respective features, as described herein. An output of the classifier 102 is then determined based on the transformed training data items generated by the multi-feature differential privacy layer 106. The output of the classifier 102 for the various training data items is used to modify the behavior of the classifier 102. A next epoch can be performed by providing the training data items of the training data 116 to the modified classifier 102 again and repeating. Additional training epochs may be performed until the output of the classifier 102 reaches a suitable level of accuracy.

The example of FIG. 1 also shows the adversary model 112. The adversary model 112 is a machine learning model that is trained to execute a membership inference attack on the classifier 102. The output of the adversary model 112 may be used, as described herein, to modify the differential privacy budgets applied to different features of the training data 116.

To train the adversary model 112, the training data 116 and test data 118 may be classified by the classifier 102 (e.g., after the classifier 102 is trained). The test data 118 may be, for example, a set of disjoint data that is from the same population as the training data 116. Obtaining test data 118 that is a set of disjoint data from the same population as the training data 116 can be achieved by obtaining a data set and then splitting the data set into training data 116 and test data 118. The test data 118 may be used, as described herein, to train the classifier 102 while the test data 118 may be used, as described herein, to train the adversary model 112.

The adversary model 112 may be provided with the training data 116, a set of predicted class probabilities for the training data 116 generated by the classifier 102, and true classes for the training data 116. From this data, the adversary model 112 determines a training data membership loss. The training data membership loss may be based on the probabilities, determined by the adversary model 112, that each training data item of the training data 116 is a member of the training data 116. In some examples, the training data membership loss is a sum of the log probabilities that each training data item is part of the training data 116.

The adversary model 112 may also be provided with the test data 118, a set of predicted class probabilities for the test data 118 generated by the classifier 102, and true classes for the training data 116. From this, the adversary model 112 may determine a test membership inference loss. The test data membership loss may be based on the probabilities, determined by the adversary model 112, that each test data time of the test data 118 is a member of the training data 116. In some examples, the test data membership loss is a sum of the log probabilities that each test data item is part of the test data 118.

The adversary model 112 may also find an adversary loss, which is an indication of how likely the adversary model 112 is to correctly determine that a training data item of the training data 116 is part of the training data 116. In some examples, the adversary loss is or is based on an average of the training data membership loss and the test membership loss. Weights or other properties of the adversary model 112 may be updated based on the adversary loss.

FIG. 1 also shows a feature importance tool 110. The feature importance tool 110 may generate an output indicating the relative importance of different input item features to the output generated by the classifier 102. The feature importance tool 110 can be constructed using any suitable feature importance technique. In some examples, the feature importance tool 110 utilizes one or more filter techniques such as, for example, an information gain technique, a chi-square test, Fisher's Score, a correlation coefficient technique, a various threshold technique, a mean absolute difference (MAD) technique, a dispersion ratio technique, and/or the like. In some examples, the feature importance tool 110 utilizes one or more wrapper techniques such as, for example, forward feature selection, backwards feature elimination, exhaustive feature selection, recursive feature elimination, and/or the like. In some examples, the feature importance tool 110 utilizes one or more embedded methods such as, for example, a LASSO regularization technique, or a random forest importance. In various examples, the feature importance tool 110 may use combinations of these and or other feature analysis techniques The feature importance tool 110 may provide an output indicating the importance of various input data item features to a budget tool 114 and/or a user computing device 117 associated with a user 119. The budget tool 114 may utilize the feature importance to determine privacy budgets for one or more input data item features. For example, the budget tool 114 may receive the feature importance tool 110 output indicating an importance of one or more features of the input data items and also an indication of the sensitivity data describing sensitivities or desired privacy levels for one or more of the input data features. Using this information, the budget tool 114 may set the privacy budget for one of more of the input data features.

The user computing device 117 may be any suitable computing device such as, for example, a laptop computer, a desktop computer, a tablet computer, and/or the like that may provide a user interface to the user 119. The user computing device may receive the output of the feature importance tool 110 and may also receive the adversary loss as generated by the adversary model 112. The user 119 may, via the user computing device 117, set the privacy budget for one or more of the features of the input data to be provided to the classifier 102.

Figure 2:
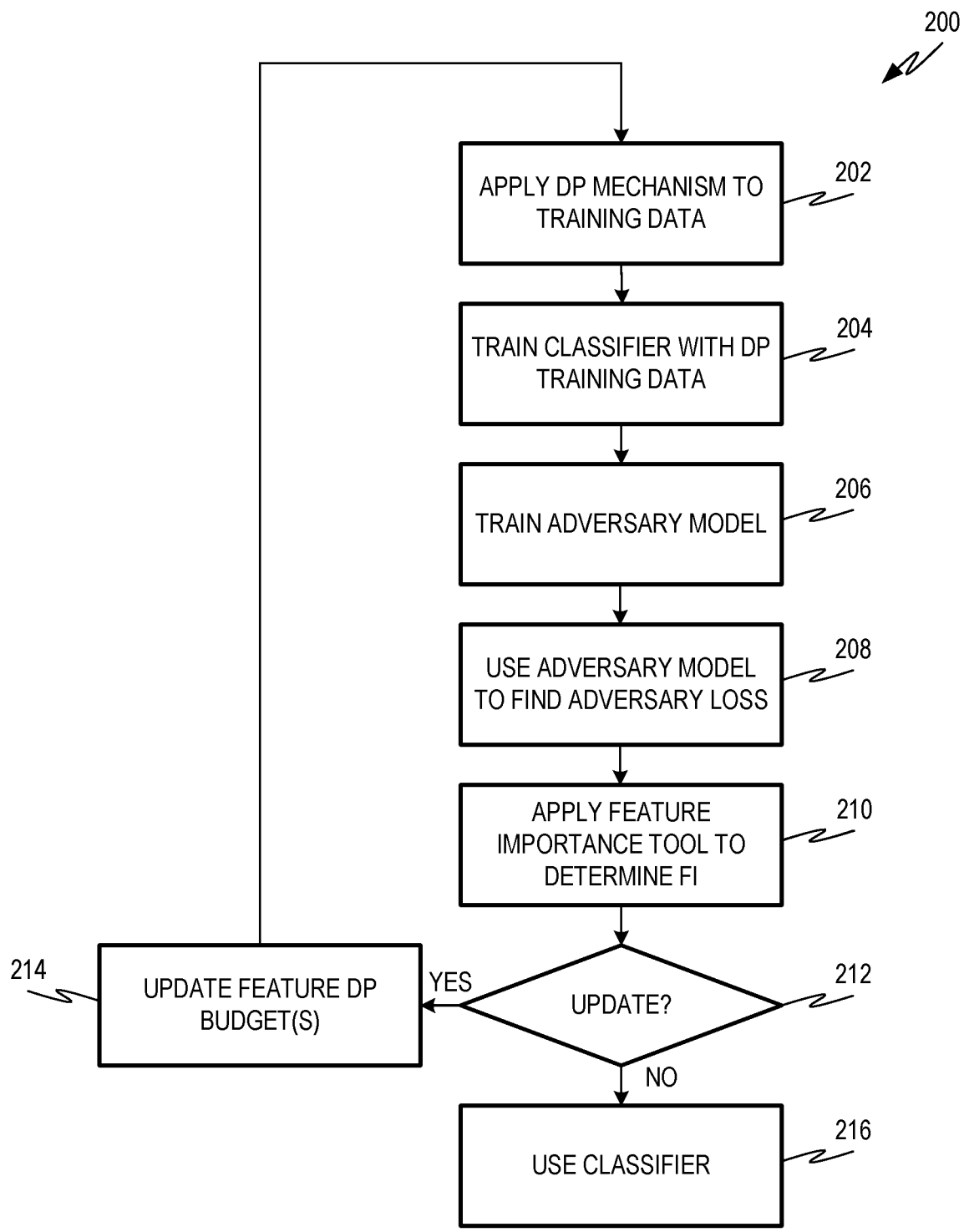
FIG. 2 is a flowchart showing one example of a process flow that may be executed in the environment to prepare the classifier for use.

FIG. 2 is a flowchart showing one example of a process flow 200 that may be executed in the environment 100 to prepare the classifier 102 for use. At operation 202, the multi-feature differential privacy layer 106 is applied to training data 116 to generate transformed training data. The transformed training data may be differentially private, for example, according to privacy budgets for the respective features, as described herein. For example, the multi-feature differential privacy layer 106 may be applied to each training data item in the manner described herein, for example, with respect to FIG. 3.

At operation 204, the classifier 102 may be trained using the transformed training data items. Any suitable training technique may be used including, for example, gradient descent, back-propagation, and/or the like. In some examples, transformed training data items may be generated before the classifier 102 is trained. The transformed training data items may then be used to train the classifier 102. In other examples, each training data item applied to the classifier 102 during training may be converted to a transformed training data item by the multi-feature differential privacy layer 106 when the training data item is provided as input to the classifier 102 during the training process.

At operation 206, the adversary model 112 may be trained. The adversary model 112 may be trained using the training data 116 and/or the test data 118 as described herein. Additional examples for training the adversary model 112 are described herein with respect to FIG. 4.

At operation 208, the adversary model 112 is used, as described herein, to determine the adversary loss for the classifier 102. As described herein, the adversary loss may describe the vulnerability of the classifier 102 to a membership inference attack to identify members of the training data 116. In various examples, the adversary loss may be based on a training data membership loss that is determined using the behavior of the classifier 102 in response to input data items from the training data 116 and a test membership loss that is determined using the behavior of the classifier 102 in response to input data items selected from the test data 118.

At operation 210, the feature importance tool 110 may be applied to the output or outputs of the classifier 102 and/or the adversary model 112 to determine importance values for various features of the input data items to the classifier. The feature importance tool 110 may send the feature importance values for the various features to the budget tool 114 and/or to the user computing device 117 for consideration by the user 119. At operation 212, it is determined whether there are to be any changes to the respective privacy budgets for the various features of the input data items. The operation 212 may be performed, for example, by the budget tool 114 and/or by the user 119 via the user computing device 117. If there is to be a change to the privacy budget of one or more of the features of the input data items, the change is made at operation 214 and the process flow 200 may return to the operation 202 with the updated feature privacy budget or budgets. If no change is to be made to the privacy budgets for the features of the input data items, the classifier 102 may be complete and ready for use, at operation 216, on production input data items.

Figure 3:
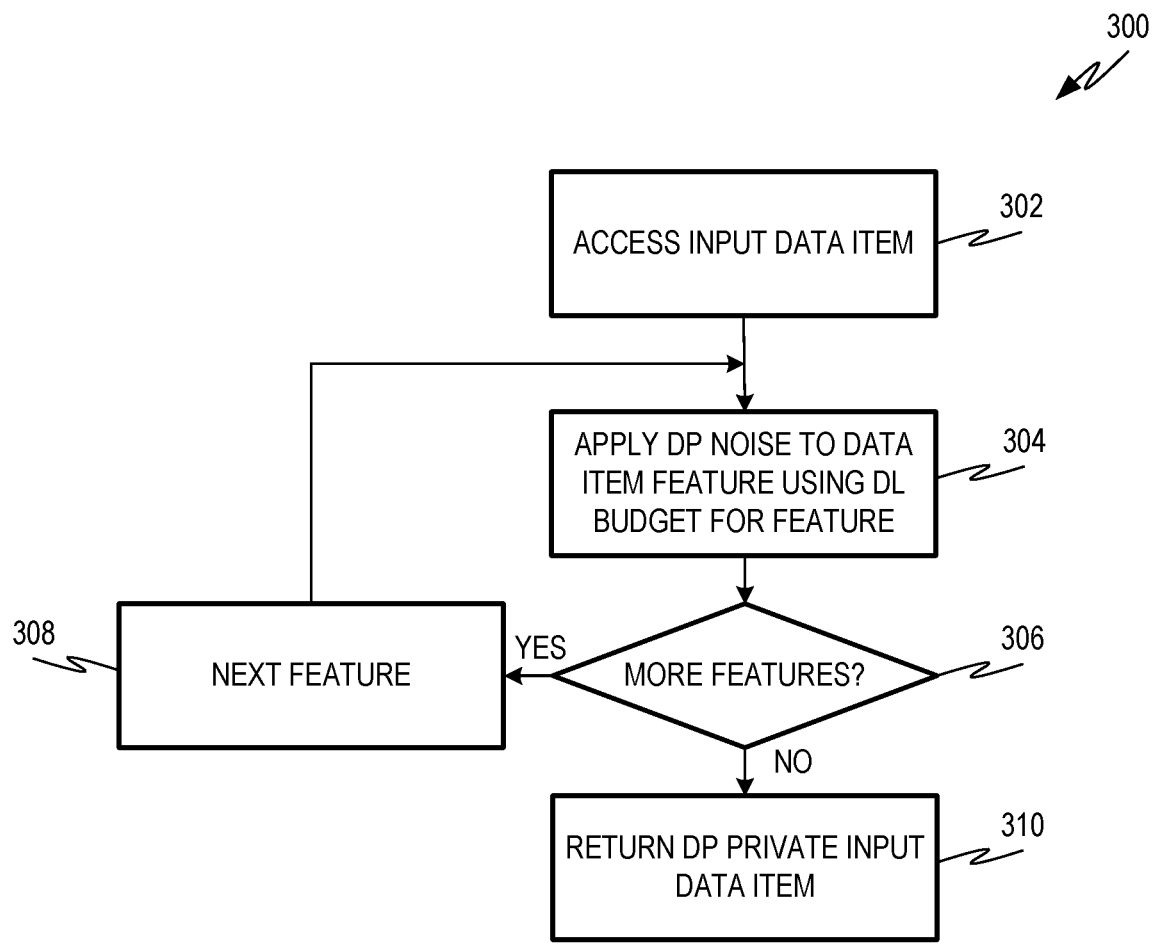
FIG. 3 is a flowchart showing one example of a process flow that may be executed by the multi-feature differential privacy tool to apply multi-feature differential privacy to input data provided to the classifier.

FIG. 3 is a flowchart showing one example of a process flow 300 that may be executed by the multi-feature differential privacy layer 106 to apply multi-feature differential privacy to input data provided to the classifier 102. For example, the process flow 300 shows one example way of executing all or part of the operation 202 of the process flow 200. At operation 302, the multi-feature differential privacy layer 106 accesses an input data item. The input data item may be an item of data that is input to the classifier 102. For example, the input data item may be selected from the training data 116, from the test data 118, and/or from other data used as input for the classifier 102.

In some examples, as described herein, the input data item comprises a plurality of features. At operation 304, the multi-feature differential privacy layer 106 applies random noise to a first input data item feature according to a privacy budget associated with the first input data item feature. The random noise applied to the first input data item feature may be determined using any suitable mechanism such as, for example, a Laplace mechanism, an exponential mechanism, a Gaussian mechanism, and/or the like. For example, the multi-feature differential privacy layer 106 may select a noise level to be applied to the feature using the privacy budget for the first input data item feature and a random noise generating technique, such as those indicated above.

For example, probability distributions, such as the Laplace distribution, exponential distribution, Gaussian distribution, and/or the like, are parameterized with a mean and a variance. The mean and the variance for a probability function determine the location and scale of the distribution. The variance term of a probability distribution may be selected based on a corresponding privacy budget in such a way that a smaller privacy budget will result in a distribution with a larger variance, and a larger privacy budget will result in a distribution with a smaller variance.

In some examples, each input data item has a corresponding probability distribution with the properties of the probability distributions depending on the privacy budgets of the respective input data items. Random noise to be applied to each input data item may be drawn from the corresponding probability distributions. For example, random noise to be applied to a first input data item may be drawn from a first probability distribution having a variance based on the privacy budget for the first input data item. Random noise to be applied to a second input data item may be drawn from a second probability distribution having a variance based on the privacy budget for the second input data item, and so on.

Consider again the example in which the classifier 102 is trained to classify an individual's propensity to purchase an item. The input data item may include various features of an individual including the individual's name, address, age, purchase history, and so forth. If the first considered feature is the individual's name, the multi-feature differential privacy layer 106 may access a privacy budget associated with the feature "name" and apply noise to the name according to the budget. Also, consider again the example in which the classifier 102 is trained to identify human faces in an image. The first feature may be a sub-portion of the image (e.g., a subset of pixel values in an image). For example, the subset of pixel values may be in a part of the image that often corresponds to a background of the image. The multi-feature differential privacy layer 106 may access a privacy budget associated with the current subset of pixel values and apply noise to the pixel values according to the budget.

At operation 306, the multi-feature differential privacy layer 106 determines if there are any remaining features in the input data item. If there are additional features, the multi-feature differential privacy layer 106 considers the next feature at operation 308 and returns to operation 304 to apply noise to the next feature using a random noise generating technique, such as the examples mentioned herein, and the privacy budget associated with the next feature. When no more features remain at operation 306, the multi-feature differential privacy layer 106 returns a transformed input data item at operation 310. For example, the transformed input data item may be differentially private, for example, according to privacy budgets for the respective features, as described herein. For example, the transformed input data item returned at operation 310 may have noise applied to its features differentially based on privacy budgets associated with the various features, as described herein.

Figure 4:
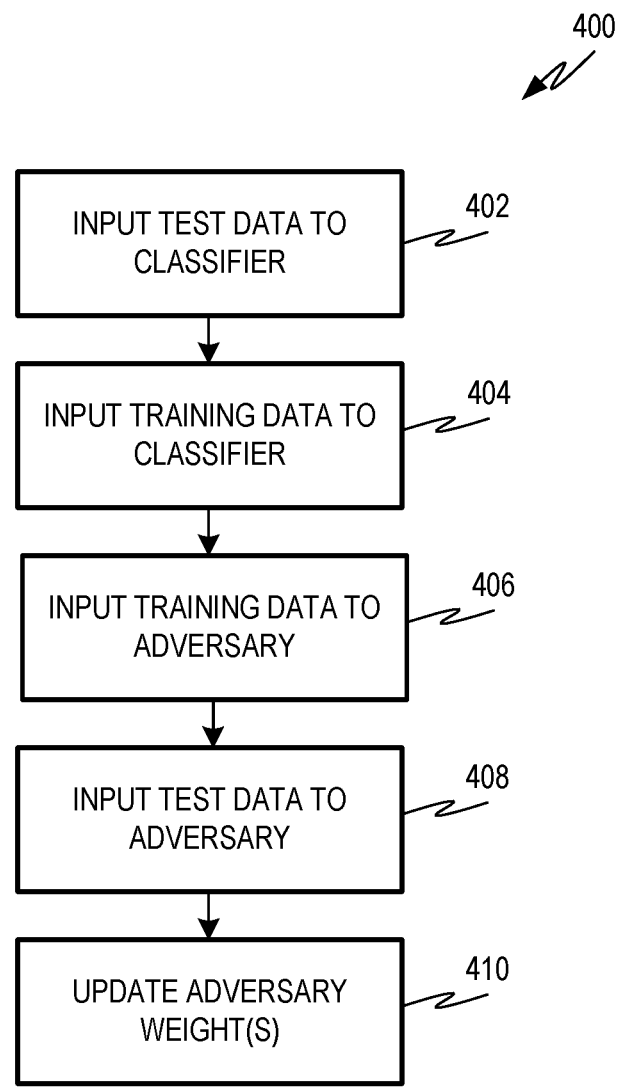
FIG. 4 is a flowchart showing one example of a process flow that may be executed in the environment to train the adversary model.

FIG. 4 is a flowchart showing one example of a process flow 400 that may be executed in the environment 100 to train the adversary model 112. For example, the process flow 400 is one example way of performing the operation 206 of the process flow 200.

At operation 402, test data 118 is provided to the classifier 102. The classifier 102, in response, generates class probabilities for the test data items of the test data 118. Each test data item of the test data 118 may be described by one or more class probabilities. At operation 404, training data 116 is provided to the classifier 102. The classifier 102 may generate class probabilities for the training data 116 such that each training data item is described by one or more class probabilities.

At operation 406, the training data, training data class probabilities generated by the classifier, and true classes for the training data 116 are provided to the adversary model 112. The adversary model 112 may generate a training data membership loss indicating the probabilities that the training data items are part of the training data 116. At operation 408, the test data, test data class probabilities generated by the classifier, and true classes for the test data 118 are provided to the adversary model 112. The adversary model 112 may generate a test data membership loss indicating the probabilities that the test data items are part of the test data 118. The adversary model 112 may generate an adversary loss from the test data membership loss and the training data membership loss as described herein. At operation 410, the weights or other properties of the adversary model 112 may be updated. In some examples, the process flow 400 is executed multiple times, for example, until a suitable adversary loss is reached and/or until the adversary loss becomes stable.

In some examples, input data items for a classifier may have a large number of features such that it may not be desirable and/or practical to set a feature specific privacy budget for each feature. For example, it may tax a user or budget tool to determine a specific privacy budget for each feature of input data items when the input data items include a large number of features. Various examples described herein address this and other challenges by utilizing a variational autoencoder to apply differential privacy. For example, a training data item may be provided to an encoder model. The encoder model may generate a latent variable value set from the training data item. The latent variable value set may include a number of latent variables that is less than the number of features of the training data item. Differential privacy may be applied to the latent variable set on a latent variable-by-latent variable basis. Once differential privacy is applied, the modified latent variable set is provided to a decoder model. The decoder model transforms the modified latent variable set to generate a transformed training data item. The transformed data item may be differentially private, as described herein. The transformed training data item may then be used to train a classifier.

Figure 5:
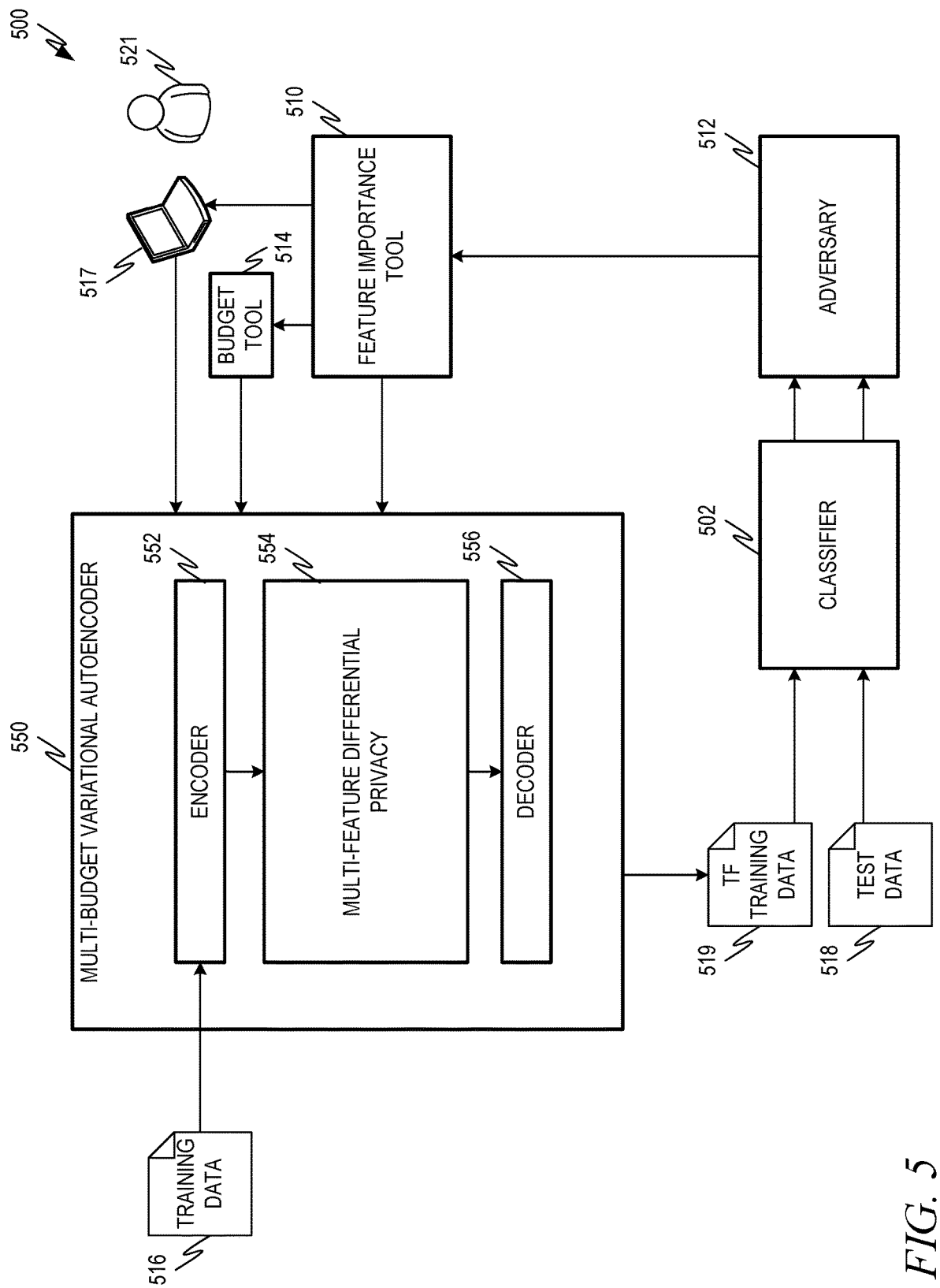
FIG. 5 is a diagram showing one example of an arrangement for implementing differential privacy on a latent variable basis.

FIG. 5 is a diagram showing one example of an environment 500 for implementing differential privacy on a latent variable basis. The environment 500 includes a classifier 502, an adversary model 512, a feature importance tool 510, a budget tool 514, and a multi-budget variational autoencoder 550. Similar to the environment 100, various components including, for example, the classifier 502, the adversary model 512, the feature importance tool 510, the budget tool 514, and the multi-budget variational autoencoder 550 may execute at one or more computing devices, such as the computing devices described herein with respect to FIGS. 8 and 9.

The multi-budget variational autoencoder 550 comprises an encoder model 552, a multi-feature differential privacy tool 554, and a decoder model 556. Training data 516 is provided to the encoder model 552. The training data 516 comprises various training data items, where each training data item includes a number of features, as described herein. The encoder model 552 is trained to transform a training data item into latent space. The representation of a training data item in the latent space comprises a set of latent variables. The number of latent variables for a training data item may be less than the number of features for that training data item. The set of latent variables for a training data item is provided to the multi-feature differential privacy tool 554. The multi-feature differential privacy tool 554 applies latent variable specific privacy budgets to the set of latent variables. For example, each latent variable of the set of latent variables may have an associated privacy budget. The multi-feature differential privacy tool 554 may apply random noise to the latent variables of the set of latent variables according to each latent variable's corresponding privacy budget. For example, random noise to be applied to each of the latent variables may be drawn from separate probability distributions (e.g., Laplace distribution, exponential distribution, Gaussian distribution, and/or the like), having different variance terms. The value of each latent variable's privacy budget may correspond to the value of its probability distribution's variance term. This results in a modified set of latent variables.

The modified set of latent variables is provided to the decoder model 556. The decoder model 556 transforms the modified set of latent variables to generate a transformed training data item. The transformed training data item may be differentially private on a latent variable-by-latent variable basis, as described herein. The multi-budget variational autoencoder 550 may be used in this manner on some or all of the training data items included in the training data 516. This may result in transformed training data 519.

The transformed training data 519 may include the training data items from the training data 516 acted upon by the multi-budget variational autoencoder 550. The transformed training data 519 may be used to train a classifier 502. The classifier 502 may be trained in any suitable manner including, for example, in the manner described above with respect to the classifier 102. For example, the classifier 502 may be trained using a gradient descent technique, a back propagation technique, or any other suitable technique.

The environment 500 also includes an adversary model 512. The adversary model 512 may be trained and used in a manner similar to that of the adversary model 112 of FIG. 1 and as described with respect to FIG. 4. The environment 500 also includes a feature importance tool 510. The feature importance tool 510 may be similar to the feature importance tool 110 of the environment 100, but in some examples, may also relate latent variables to corresponding input data item features. For example, the feature importance tool 510 may determine the importance of various features of input data items to the classifier and may also relate the features to corresponding latent variables generated by the encoder model 552.

The output of the feature importance tool 510 may be provided to a budget tool 514 and or to a user computing device 517 associated with a user 521. The budget tool 514 may generate privacy budgets for the respective latent variables of the set of latent variables generated by the encoder model 552. Also, in some examples, the user 521 may determine the privacy budgets for the respective latent variables of the set of latent variables generated by the encoder model 552, based on the output of the feature importance tool 510.

Figure 6:
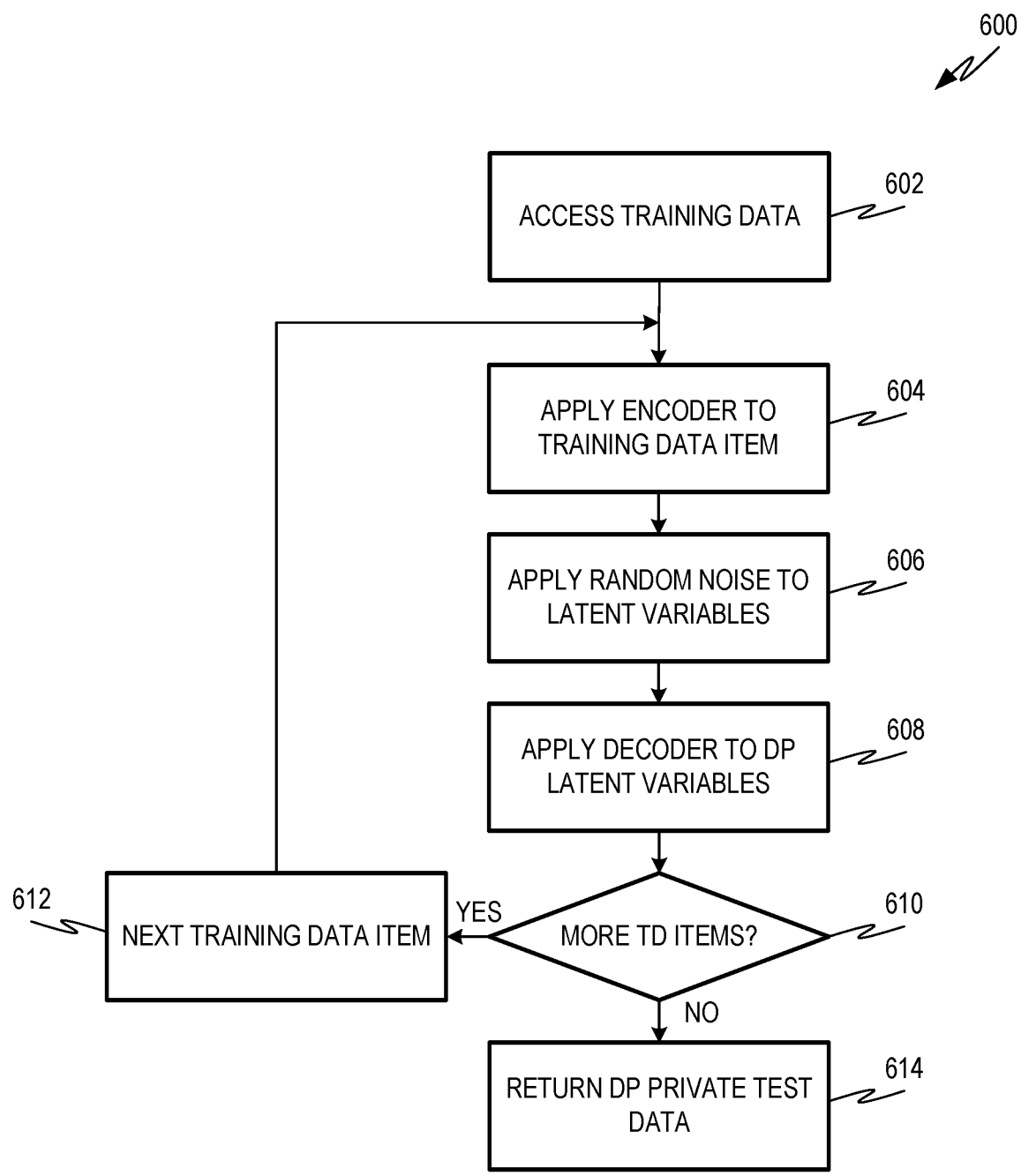
FIG. 6 is a flow chart showing one example of a process flow that may be performed by the multi-budget variational autoencoder of FIG. 5 to generate transformed training data.

FIG. 6 is a flow chart showing one example of a process flow 600 that may be performed by the multi-budget variational autoencoder 550 of FIG. 5 to generate transformed training data 519. At operation 602, the multi-budget variational autoencoder 550 accesses the training data 516. At operation 604, the multi-budget variational autoencoder 550 applies the encoder model 552 to a first training data item. This results in a set of latent variables corresponding to the first training data item. At operation 606, the multi-budget variational autoencoder applies random noise to the set of latent variables. Each latent variable may have an associated privacy budget. The random noise applied to each latent variable may be determined using the privacy budget for that latent variable. The random noise applied to the respective latent variables may be determined using any suitable mechanism such as, for example, a Laplace mechanism, an exponential mechanism, a Gaussian mechanism, and or the like. The result of applying random noise to the set of latent variables is a modified latent variable set.

At operation 608, the decoder model 556 is applied to the modified latent variable set resulting in a transformed training data item corresponding to the training data item provided to the encoder model 552 at operation 604. At operation 610, the multi-budget variational autoencoder determines if there are any more training data items. If there are more training data items, the multi-budget variational autoencoder 550 moves to the next training data item at operation 612 and returns to operations 604. If there are no more training data items at operation 610, the multi-budget variational autoencoder 550 returns the transformed training data 519 at operation 614.

Figure 7:
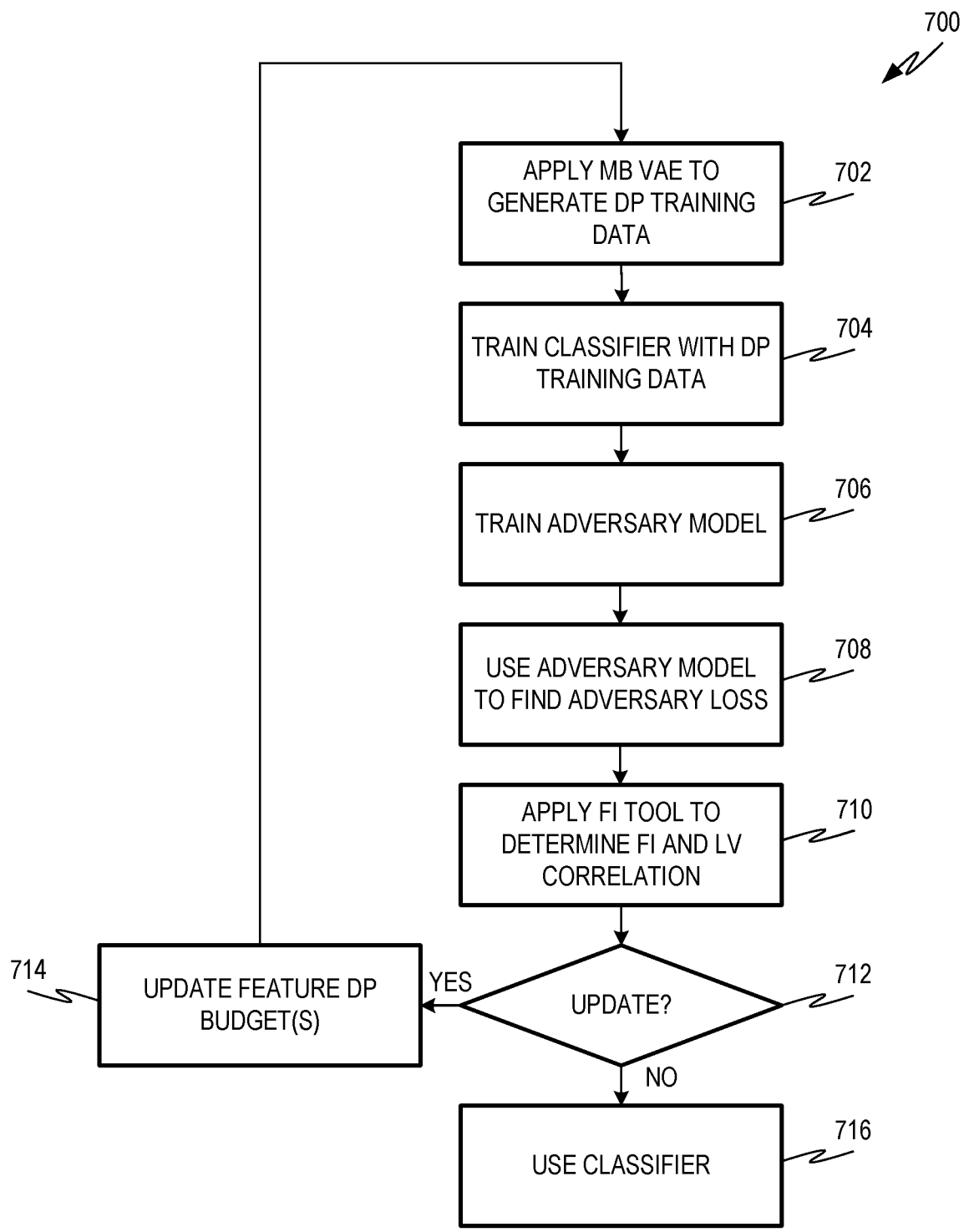
FIG. 7 is a flowchart showing one example of a process flow that may be executed in the environment of FIG. 5 to prepare the classifier for use.

FIG. 7 is a flowchart showing one example of a process flow 700 that may be executed in the environment 500 to prepare the classifier 502 for use. At operation 702, the multi-budget variational autoencoder 550 is applied to training data 516 to generate transformed training data 519. For example, the multi-budget variational autoencoder 550 may be applied to each training data item in the manner described herein, for example, with respect to FIG. 6 herein.

At operation 704, the classifier 502 may be trained using the transformed training data 519. Any suitable training technique may be used including, for example, gradient descent, back-propagation, and/or the like. At operation 706, the adversary model 512 may be trained. The adversary model 512 may be trained using the training data 516 and/or the test data 518 as described herein. In some examples, the adversary model 512 is trained in a manner similar to that described herein with respect to FIG. 4.

At operation 708, the adversary model 512 is used, as described herein, to determine the adversary loss for the classifier 502. As described herein, the adversary loss may describe the vulnerability of the classifier 502 to a membership inference attack to identify members of the training data 516. In various examples, the adversary loss may be based on a training data membership loss based on the behavior of the classifier 502 on input data items from the training data 516 and a test membership loss based on the behavior of the classifier 502 on input data items selected from the test data 518.

At operation 710, the feature importance tool 510 may be applied to the output or outputs of the classifier 502 and/or the adversary model 512 to determine importance values for various features of the input data items to the classifier. The feature importance tool 510 may relate features of the input data items of the classifier 502 to latent variables of the set of latent variables generated by the encoder model 552. The feature importance tool 510 may send the feature importance values for the various features to the budget tool 514 and/or to the user computing device 517 for consideration by the user 521.

At operation 712, it is determined whether there are to be any changes to the respective privacy budgets for the various latent variables of the set of latent variables generated by the encoder model 552. The operation 712 may be performed, for example, by the budget tool 514 and/or by the user 521 via the user computing device 517. If there is to be a change to the privacy budget of one or more of the latent variables, the change is made at operation 714 and the process flow 700 may return to the operation 702 with the updated feature privacy budget or budgets. If no change is to be made to the privacy budgets for the features of the input data items, the classifier 502 may be complete and ready for use, at operation 716, on production input data items.

In view of the disclosure above, various examples are set forth below. It should be noted that one or more features of an example, taken in isolation or combination, should be considered within the disclosure of this application.

EXAMPLES

Example 1 is a computing system, comprising: at least one processor programmed to perform operations comprising: accessing training data, the training data comprising a plurality of training data items, each of the plurality of training data items comprising a plurality of features; from a first training data item of the plurality of training data items, generating a first transformed training data item using a first privacy budget corresponding to a first portion of the first training data item and a second privacy budget corresponding to a second portion of the first training data item; training a machine learning model using the first transformed training data item to generate a trained machine learning model; and using the trained machine learning model to generate at least one class probability for a data item.

In Example 2, the subject matter of Example 1 optionally includes the operations further comprising: selecting a first noise level for a first feature of the first training data item using the first privacy budget; applying the first noise level to the first feature of the first training data item; selecting a second noise level for a second feature of the first training data item using the second privacy budget; and applying the second noise level to the second feature of the first training data item.

In Example 3, the subject matter of Example 2 optionally includes the operations further comprising generating a second transformed training data item from a second training data item of the plurality of training data items, the generating of the second transformed training data item comprising: applying the first noise level to a first feature of the second training data item; and applying the second noise level to a second feature of the second training data item.

In Example 4, the subject matter of any one or more of Examples 1-3 optionally includes the operations further comprising: applying an encoder model to the first training data item to generate a first set of latent variable values, the first set of latent variable values comprising a first latent variable value and a second latent variable value; selecting a first noise level for the first latent variable value using the first privacy budget; applying the first noise level to first latent variable value; selecting a second noise level for the second latent variable value using the second privacy budget; applying the second noise level to the second latent variable value; and applying a decoder model to generate the first transformed training data item.

In Example 5, the subject matter of any one or more of Examples 1-4 optionally includes the operations further comprising: applying the trained machine learning model to the training data to generate at least one class probability for the plurality of training data items; applying the trained machine learning model to test data comprising a plurality of test data items to generate at least one class probability for the plurality of test data items; and training an adversary machine learning model using training data, the at least one class probability for the plurality of training data items, the test data, and the at least one class probability for the plurality of test data items.

In Example 6, the subject matter of Example 5 optionally includes the operations further comprising: using the adversary machine learning model to determine a training data membership loss; using the adversary machine learning model to determine a test data membership loss; and using the training data membership loss and the test data membership loss to update at least one weight of the adversary machine learning model.

In Example 7, the subject matter of any one or more of Examples 1-6 optionally includes the operations further comprising applying a feature importance tool to the machine learning model to determine a first importance value for a first feature of the plurality of features and a second importance value for a second feature of the plurality of features.

In Example 8, the subject matter of Example 7 optionally includes the operations further comprising: accessing sensitivity data describing at least a first sensitivity level for the first feature and a second sensitivity value for the second feature; and using the sensitivity data and the first importance value for the first feature to determine a modified first feature privacy budget.

In Example 9, the subject matter of any one or more of Examples 7-8 optionally includes the operations further comprising: sending the first importance value for the first feature to a user computing device; and receiving, from the user computing device, an indication of modified first feature privacy budget.

Example 10 is a computer-implemented method, comprising: accessing training data, the training data comprising a plurality of training data items, each of the plurality of training data items comprising a plurality of features; from a first training data item of the plurality of training data items, generating a first transformed training data item using a first privacy budget corresponding to a first portion of the first training data item and a second privacy budget corresponding to a second portion of the first training data item; training a machine learning model using the first transformed training data item to generate a trained machine learning model; and using the trained machine learning model to generate at least one class probability for a data item.

In Example 11, the subject matter of Example 10 optionally includes selecting a first noise level for a first feature of the first training data item using the first privacy budget; applying the first noise level to the first feature of the first training data item; selecting a second noise level for a second feature of the first training data item using the second privacy budget; and applying the second noise level to the second feature of the first training data item.

In Example 12, the subject matter of Example 11 optionally includes generating a second transformed training data item from a second training data item of the plurality of training data items, the generating of the second transformed training data item comprising: applying the first noise level to a first feature of the second training data item; and applying the second noise level to a second feature of the second training data item.

In Example 13, the subject matter of any one or more of Examples 10-12 optionally includes applying an encoder model to the first training data item to generate a first set of latent variable values, the first set of latent variable values comprising a first latent variable value and a second latent variable value; selecting a first noise level for the first latent variable value using the first privacy budget; applying the first noise level to first latent variable value; selecting a second noise level for the second latent variable value using the second privacy budget; applying the second noise level to second latent variable value; and applying a decoder model to generate the first transformed training data item.

In Example 14, the subject matter of any one or more of Examples 10-13 optionally includes applying the trained machine learning model to the training data to generate at least one class probability for the plurality of training data items; applying the trained machine learning model to test data comprising a plurality of test data items to generate at least one class probability for the plurality of test data items; and training an adversary machine learning model using training data, the at least one class probability for the plurality of training data items, the test data, and the at least one class probability for the plurality of test data items.

In Example 15, the subject matter of Example 14 optionally includes using the adversary machine learning model to determine a training data membership loss; using the adversary machine learning model to determine a test data membership loss; and using the training data membership loss and the test data membership loss to update at least one weight of the adversary machine learning model.

In Example 16, the subject matter of any one or more of Examples 10-15 optionally includes applying a feature importance tool to the machine learning model to determine a first importance value for a first feature of the plurality of features and a second importance value for a second feature of the plurality of features.

In Example 17, the subject matter of Example 16 optionally includes accessing sensitivity data describing at least a first sensitivity level for the first feature and a second sensitivity value for the second feature; and using the sensitivity data and the first importance value for the first feature to determine a modified first feature privacy budget.

Example 18 is a non-transitory machine-readable medium comprising instructions thereon that, when executed by at least one processor, causes the at least one processor to perform operations comprising: accessing training data, the training data comprising a plurality of training data items, each of the plurality of training data items comprising a plurality of features; from a first training data item of the plurality of training data items, generating a first transformed training data item using a first privacy budget corresponding to a first portion of the first training data item and a second privacy budget corresponding to a second portion of the first training data item; training a machine learning model using the first transformed training data item to generate a trained machine learning model; and using the trained machine learning model to generate at least one class probability for a data item.

In Example 19, the subject matter of Example 18 optionally includes the operations further comprising: selecting a first noise level for a first feature of the first training data item using the first privacy budget; applying the first noise level to the first feature of the first training data item; selecting a second noise level for a second feature of the first training data item using the second privacy budget; and applying the second noise level to the second feature of the first training data item.

In Example 20, the subject matter of any one or more of Examples 18-19 optionally includes the operations further comprising: applying an encoder model to the first training data item to generate a first set of latent variable values, the first set of latent variable values comprising a first latent variable value and a second latent variable value; selecting a first noise level for the first latent variable value using the first privacy budget; applying the first noise level to first latent variable value; selecting a second noise level for the second latent variable value using the second privacy budget; applying the second noise level to second latent variable value; and applying a decoder model to generate the first transformed training data item.

Figure 8:
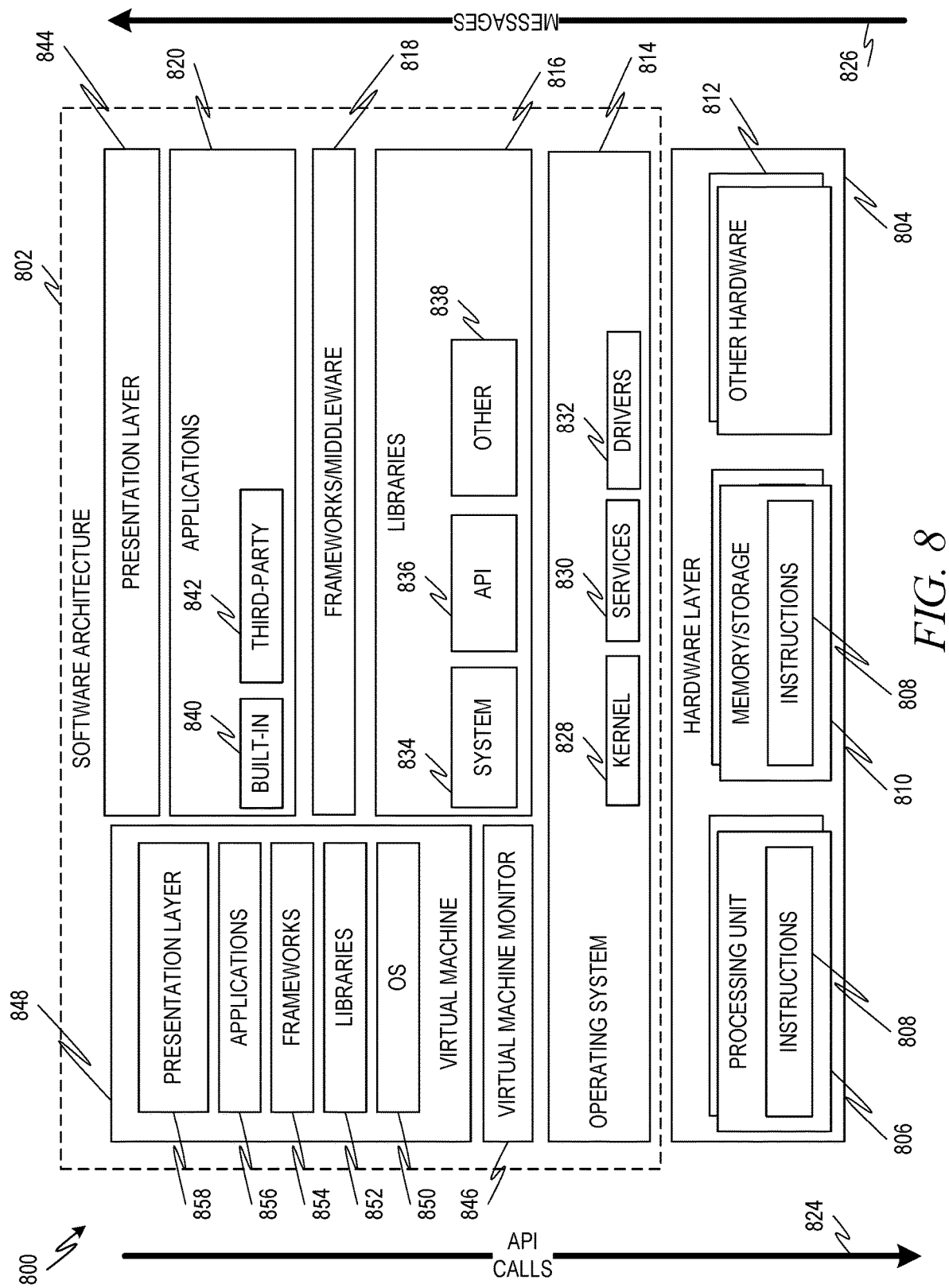
FIG. 8 is a block diagram showing one example of an architecture for a computing device.

FIG. 8 is a block diagram 800 showing one example of an architecture 802 for a computing device. The architecture 802 may be used in conjunction with various hardware architectures, for example, as described herein. FIG. 8 is merely a non-limiting example of an architecture and many other architectures may be implemented to facilitate the functionality described herein. An example hardware layer 804 is illustrated and can represent, for example, any of the above referenced computing devices. In some examples, the hardware layer 804 may be implemented according to the architecture of the computer system of FIG. 9.

The hardware layer 804 comprises one or more processing units 806 having associated executable instructions 808. Executable instructions 808 represent the executable instructions of the architecture 802, including implementation of the methods, modules, subsystems, components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the architecture 802 may be conceptualized as a stack of layers where each layer provides particular functionality. For example, the architecture 802 may include layers such as an operating system 814, libraries 816, middleware layer 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The middleware layer 818 (also sometimes referred to as frameworks) may provide a higher-level common infrastructure that may be utilized by the applications 820 and/or other software components/modules. For example, the middleware layer 818 may provide various graphic user interface (GUI) functions, high-level resource management, high-level location services, and so forth. The middleware layer 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of built-in applications 840 may include, but are not limited to, a contacts application, a browser application, a book reader application, a location application, a median application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830, and/or drivers 832), libraries (e.g., system 834, API libraries 836, and other libraries 838), and middleware layer 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). An architecture executes within the virtual machine such as an operating system 850, libraries 852, frameworks/middleware 854, applications 856 and/or presentation layer 858. These layers of architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 9:
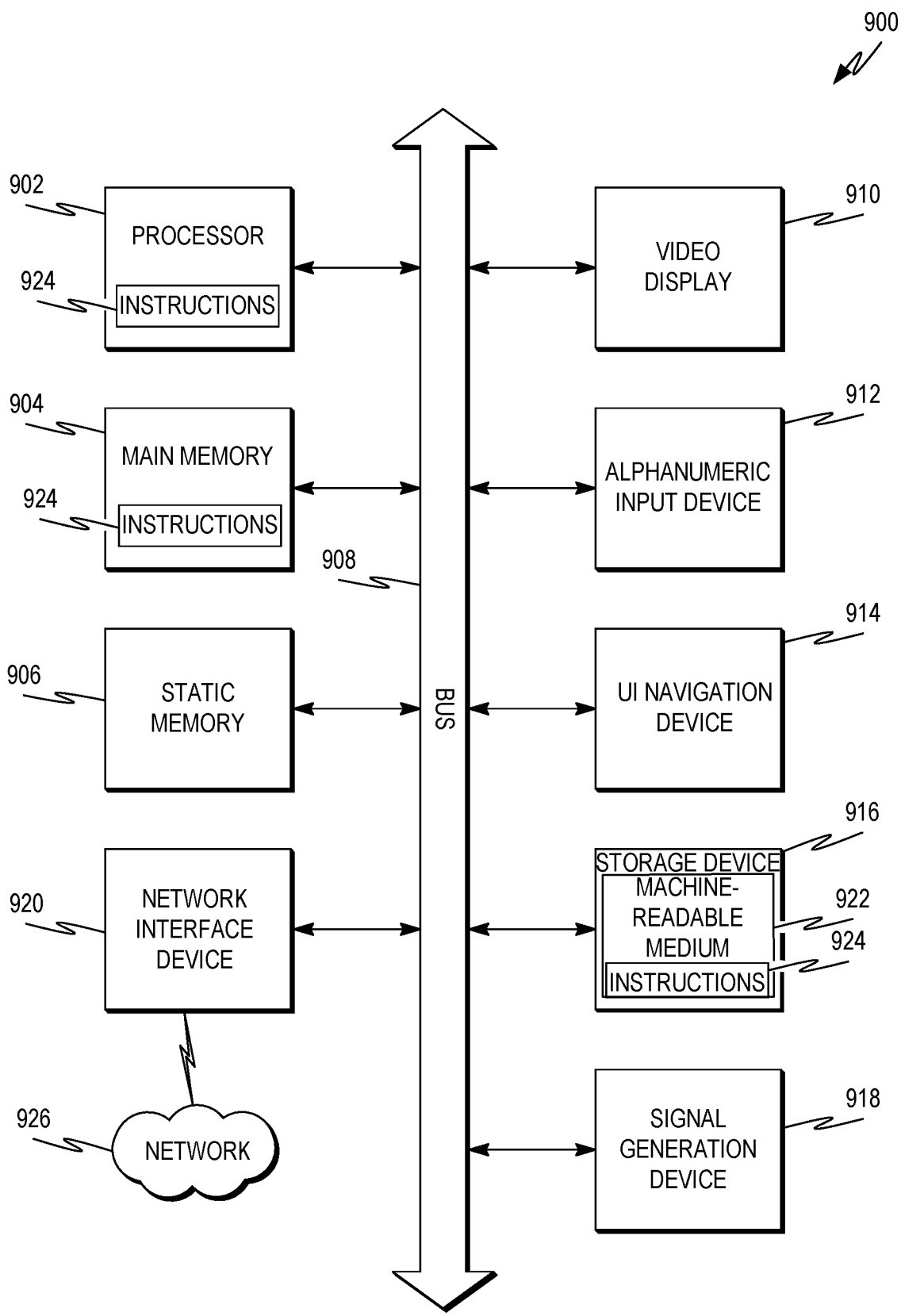
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media, such as medium 922 and the like include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A computing system, comprising:
   at least one processor programmed to perform operations comprising:

accessing training data, the training data comprising a plurality of training data items, each of the plurality of training data items comprising a plurality of features;

from a first training data item of the plurality of training data items, generating a first transformed training data item using a first privacy budget corresponding to a first portion of the first training data item and a second privacy budget corresponding to a second portion of the first training data item;

training a machine learning model using the first transformed training data item to generate a trained machine learning model;

applying the trained machine learning model to the training data to generate at least one class probability for the plurality of training data items;

applying the trained machine learning model to test data comprising a plurality of test data items to generate at least one class probability for the plurality of test data items;

training an adversary machine learning model using training data, the at least one class probability for the plurality of training data items, the test data, and the at least one class probability for the plurality of test data items;

using the adversary machine learning model to determine a training data membership loss;

using the adversary machine learning model to determine a test data membership loss; and using the training data membership loss and the test data membership loss to update at least one weight of the adversary machine learning model.

2. The computing system of claim 1, the operations further comprising:

selecting a first noise level for a first feature of the first training data item using the first privacy budget;

applying the first noise level to the first feature of the first training data item;

selecting a second noise level for a second feature of the first training data item using the second privacy budget; and applying the second noise level to the second feature of the first training data item.

3. The computing system of claim 2, the operations further comprising generating a second transformed training data item from a second training data item of the plurality of training data items, the generating of the second transformed training data item comprising:

applying the first noise level to a first feature of the second training data item; and applying the second noise level to a second feature of the second training data item.

4. The computing system of claim 1, the operations further comprising:

applying an encoder model to the first training data item to generate a first set of latent variable values, the first set of latent variable values comprising a first latent variable value and a second latent variable value;

selecting a first noise level for the first latent variable value using the first privacy budget;

applying the first noise level to first latent variable value;

selecting a second noise level for the second latent variable value using the second privacy budget;

applying the second noise level to the second latent variable value; and applying a decoder model to generate the first transformed training data item.

5. The computing system of claim 1, the operations further comprising applying a feature importance tool to the machine learning model to determine a first importance value for a first feature of the plurality of features and a second importance value for a second feature of the plurality of features.

6. The computing system of claim 5, the operations further comprising:

accessing sensitivity data describing at least a first sensitivity level for the first feature and a second sensitivity value for the second feature; and using the sensitivity data and the first importance value for the first feature to determine a modified first feature privacy budget.

7. The computing system of claim 5, the operations further comprising:

sending the first importance value for the first feature to a user computing device; and receiving, from the user computing device, an indication of modified first feature privacy budget.

8. A computer-implemented method, comprising:

accessing training data, the training data comprising a plurality of training data items, each of the plurality of training data items comprising a plurality of features;

from a first training data item of the plurality of training data items, generating a first transformed training data item using a first privacy budget corresponding to a first portion of the first training data item and a second privacy budget corresponding to a second portion of the first training data item;

training a machine learning model using the first transformed training data item to generate a trained machine learning model;

applying the trained machine learning model to the training data to generate at least one class probability for the plurality of training data items;

applying the trained machine learning model to test data comprising a plurality of test data items to generate at least one class probability for the plurality of test data items;

training an adversary machine learning model using training data, the at least one class probability for the plurality of training data items, the test data, and the at least one class probability for the plurality of test data items;

using the adversary machine learning model to determine a training data membership loss;

using the adversary machine learning model to determine a test data membership loss; and using the training data membership loss and the test data membership loss to update at least one weight of the adversary machine learning model.

9. The method of claim 8, further comprising:

selecting a first noise level for a first feature of the first training data item using the first privacy budget;

applying the first noise level to the first feature of the first training data item;

selecting a second noise level for a second feature of the first training data item using the second privacy budget; and applying the second noise level to the second feature of the first training data item.

10. The method of claim 9, further comprising generating a second transformed training data item from a second training data item of the plurality of training data items, the generating of the second transformed training data item comprising:

applying the first noise level to a first feature of the second training data item; and applying the second noise level to a second feature of the second training data item.

11. The method of claim 8, further comprising:

applying an encoder model to the first training data item to generate a first set of latent variable values, the first set of latent variable values comprising a first latent variable value and a second latent variable value;

selecting a first noise level for the first latent variable value using the first privacy budget;

applying the first noise level to first latent variable value;

selecting a second noise level for the second latent variable value using the second privacy budget;

applying the second noise level to second latent variable value; and applying a decoder model to generate the first transformed training data item.

12. The method of claim 8, further comprising applying a feature importance tool to the machine learning model to determine a first importance value for a first feature of the plurality of features and a second importance value for a second feature of the plurality of features.

13. The method of claim 12, further comprising:

accessing sensitivity data describing at least a first sensitivity level for the first feature and a second sensitivity value for the second feature; and using the sensitivity data and the first importance value for the first feature to determine a modified first feature privacy budget.

14. A non-transitory machine-readable medium comprising instructions thereon that, when executed by at least one processor, causes the at least one processor to perform operations comprising:

accessing training data, the training data comprising a plurality of training data items, each of the plurality of training data items comprising a plurality of features;

from a first training data item of the plurality of training data items, generating a first transformed training data item using a first privacy budget corresponding to a first portion of the first training data item and a second privacy budget corresponding to a second portion of the first training data item;

training a machine learning model using the first transformed training data item to generate a trained machine learning model;

applying the trained machine learning model to the training data to generate at least one class probability for the plurality of training data items;

applying the trained machine learning model to test data comprising a plurality of test data items to generate at least one class probability for the plurality of test data items;

training an adversary machine learning model using training data, the at least one class probability for the plurality of training data items, the test data, and the at least one class probability for the plurality of test data items;

using the adversary machine learning model to determine a training data membership loss;

using the adversary machine learning model to determine a test data membership loss; and using the training data membership loss and the test data membership loss to update at least one weight of the adversary machine learning model.

15. The medium of claim 14, the operations further comprising:

selecting a first noise level for a first feature of the first training data item using the first privacy budget;

applying the first noise level to the first feature of the first training data item;

selecting a second noise level for a second feature of the first training data item using the second privacy budget; and applying the second noise level to the second feature of the first training data item.

16. The medium of claim 15, the operations further comprising generating a second transformed training data item from a second training data item of the plurality of training data items, the generating of the second transformed training data item comprising:

applying the first noise level to a first feature of the second training data item; and applying the second noise level to a second feature of the second training data item.

17. The medium of claim 14, the operations further comprising:

applying an encoder model to the first training data item to generate a first set of latent variable values, the first set of latent variable values comprising a first latent variable value and a second latent variable value;

selecting a first noise level for the first latent variable value using the first privacy budget;

applying the first noise level to first latent variable value;

selecting a second noise level for the second latent variable value using the second privacy budget;

applying the second noise level to second latent variable value; and applying a decoder model to generate the first transformed training data item.

18. The medium of claim 14, the operations further comprising applying a feature importance tool to the machine learning model to determine a first importance value for a first feature of the plurality of features and a second importance value for a second feature of the plurality of features.

19. The medium of claim 18, the operations further comprising:

accessing sensitivity data describing at least a first sensitivity level for the first feature and a second sensitivity value for the second feature; and using the sensitivity data and the first importance value for the first feature to determine a modified first feature privacy budget.

20. The medium of claim 18, the operations further comprising:

sending the first importance value for the first feature to a user computing device; and receiving, from the user computing device, an indication of modified first feature privacy budget.

* * * * *